United States Patent [19]

Liss et al.

[11] 4,200,495

[45] Apr. 29, 1980

[54] PREVENTION OF DEFLUIDIZATION IN THE TREATMENT OF CAKING CARBONACEOUS SOLIDS

[76] Inventors: Barry Liss, New York, N.Y.; Charles R. Welter, South Charleston, W. Va.

[21] Appl. No.: 943,460

[22] Filed: Sep. 18, 1978

[51] Int. Cl.$^2$ ................ C10B 57/08; C10B 47/24; C10B 49/10; C10B 49/22

[52] U.S. Cl. ........................... 201/9; 48/210; 201/22; 201/28; 201/31; 208/8 R; 208/127; 208/137; 208/157

[58] Field of Search ............ 48/210; 201/9, 22, 28, 201/31; 208/127, 137, 157 R, 8 R

[56] References Cited

U.S. PATENT DOCUMENTS

| | | | |
|---|---|---|---|
| 2,167,099 | 7/1939 | Benezech | 201/9 |
| 2,577,632 | 12/1951 | Roetheli | 201/31 |
| 2,709,675 | 5/1955 | Phinney | 201/31 |
| 2,881,130 | 4/1959 | Pfeiffer et al. | 208/127 |
| 2,987,465 | 6/1961 | Johanson | 208/10 |
| 3,070,515 | 12/1962 | Sylvander | 201/9 |
| 3,171,369 | 3/1965 | Stephens et al. | 48/206 X |
| 3,551,513 | 12/1970 | Suzukawa et al. | 208/127 |
| 3,617,524 | 11/1971 | Conn | 208/157 |
| 3,927,996 | 12/1975 | Knudsen et al. | 48/210 X |
| 3,988,236 | 10/1976 | Albright et al. | 208/8 R |
| 4,057,512 | 11/1977 | Vodovic et al. | 48/210 X |

*Primary Examiner*—Barry S. Richman

[57] ABSTRACT

In the introduction of fresh carbonaceous particles into a fluid-bed reaction zone at injection velocities in excess of 20 ft/sec, a shroud gas is passed through a shroud passage on the injection nozzle at a velocity in excess of about 750 ft/sec, preferably at from about 1,000 to about 5,000 ft/sec, in sufficient quantities to supply a substantial portion of the overall energy input into the reaction zone for dispersion of the fresh particles and for breaking up of any agglomerates formed upon injection of the fresh particles into the reaction zone. By accommodating the agglomerating tendencies of the fresh feed material, the high energy shroud gas effectively contributes to the prevention of defluidization of the bed. The shroud gas may be inert or may comprise a gaseous reagent that reacts with the fresh carbonaceous particles in the reaction zone. The energy supplied by the shroud gas desirably is at least about 80% of said energy input to the reaction zone.

44 Claims, 6 Drawing Figures

PREVENTION OF DEFLUIDIZATION IN THE TREATMENT OF CAKING CARBONACEOUS SOLIDS

BACKGROUND OF THE INVENTION

1. Field of the Invention

This invention relates to a method of avoiding excessive agglomeration of carbonaceous solid particles so as to prevent defluidization in a fluid-bed reaction zone. More particularly, it is an improved method for injecting fresh carbonaceous particles into a fluid-bed hydrocarbonization, gasification or carbonization reaction zone.

2. Description of the Prior Art

Increasing energy needs have focused attention on solid fossil fuels due to their availability in the United States in a relatively abundant supply and their potential value if converted into more useful forms of energy and feedstock. Processes such as carbonization, gasification, hydrocarbonization and hydrogasification, wherein synthetic fuel products have been prepared by introducing a fluidized stream of finely-divided coal or other solid carbonaceous particles into a fluid-bed reaction zone and reacting the said particles at elevated temperatures in the presence of air, steam, hydrogen or inert gases are well known. A major operating difficulty in such processes has been the tendency of coal or other carbonaceous particles, especially intensified in a hydrogen-rich atmosphere, to agglomerate at the elevated temperature required for reaction.

Coal particles, especially caking, swelling or agglomerating coals, become sticky when heated in a hydrogen-rich atmosphere. Even non-caking, non-swelling and non-agglomerating coals become sticky when heated in such an atmosphere. Coal particles begin to become sticky at temperatures in the range of from about 280° C., commonly from about 350° C. to about 500° C., depending on the specific properties of the coal, the atmosphere and the rate of heating. Such stickiness is due to a tarry or plastic-like material forming at or near the surface of each coal particle, by a partial melting or decomposition process. On further heating over a period of time, the tarry or plastic-like material is further transformed into volatile products and a substantially porous, solid material referred to as a "char." The length of this time period depends upon the actual temperature of heating and is shorter with an increase in temperature. The term "plastic transformation" as used herein refers to such tendency of the surfaces of coal or other carbonaceous particles being heated, particularly when heated in a hydrogen atmosphere, to develop stickiness and transform into substantially solid char, non-sticky surfaces. "Plastic transformation" is undergone by both normally agglomerating coals and coals which may develop a sticky surface only in a hydrogen-rich atmosphere.

Agglomerating or caking coals partially soften and become sticky when heated to temperatures between about 280° C., commonly from about 350° C., to about 500° C. The duration of stickiness depends on the temperature of the coal, being on the order of minutes at the lower end of said range and being exponentially shorter, i.e. down to seconds, at the upper limits of said range. Components of the coal particles soften and gas evolves because of decomposition. Sticky coal particles undergoing plastic transformation tend to adhere to most surfaces which they contact such as walls or baffles in the reactor, particularly relatively cool walls or baffles. Moreover, contact with other sticky particles while undergoing plastic transformation results in gross particle growth through adherence of sticky particles to one another. The formation and growth of these agglomerates interferes drastically with the maintenance of a fluid-bed and excessive growth can make it impossible to maintain fluidization.

In particular, entrance ports and gas distribution plates of equipment used in fluid-bed coal conversion processes become plugged or partially plugged. Furthermore, even if plugging is not extensive, the sticky particles tend to adhere to the walls of the reaction vessel, with continued gross particle growth and the formation of multi-particle conglomerates and bridges interfering with smooth operation and frequently resulting in complete stoppage of operation as a result of defluidization of the bed.

Agglomeration of coal particles upon heating depends on operating conditions such as the heating rate, final temperature attained, ambient gas composition, coal type, particle size and total pressure. Even non-agglomerating coals, such as lignites or coals from certain sub-bituminous seams, are susceptible to agglomeration and tend to become sticky when heated in a hydrogen atmosphere. Thus, agglomeration of coal particles is accentuated in a hydrocarbonization reactor where heating in the presence of a hydrogen-rich gas actually promotes formation of a sticky surface on the coal particles reacted. Introducing any carbonaceous, combustible, solid particles, even those normally non-agglomerating, to a fluid-bed having an atmosphere tending to induce agglomeration can, moreover, result in agglomeration and defluidization of the bed.

Heavy liquid materials are also fed at times to the fluid-bed in coal conversion processes. They may be recycled heavy tar products to be converted to lower molecular weight products, light liquids and gases. Or they may be heavy liquids added from an external source to, for example, enrich the normal gas and/or liquid product, or as a means of waste disposal. Feeding such liquids is known to cause rapid loss of fluidization due to excessive particle agglomeration and plugging.

In an attempt to overcome the problems associated with agglomeration, char as a recycle material from fluidized bed processes has been mixed with an agglomerating type coal feed at a ratio as high as 8 to 1. Also, tar has been ball-milled with a great excess of absorbent char before feeding into a fluid-bed reaction zone. Such procedures reduce the unit throughput, are wasteful of energy and are, therefore, costly. Other attempts have included a pretreatment step wherein coal is oxidized and/or devolatilized superficially in order to prevent sticking and agglomeration of particles, but this lowers the yield of useful products and adds to the overall cost of the operation. Thus, it is highly desirable economically to avoid or at least reduce the extent to which such oxidation pretreatment or such char recycle is employed.

An alternate approach is that suggested by Knudsen et al, U.S. Pat. No. 3,927,996, in which the fines carried overhead by gas from a fluid-bed are monitored and the injection velocity of fresh feed material is regulated in response to changes in the fines content of the gas to produce controlled attrition of agglomerated particles in the fluid-bed. In this approach, a caking coal or other similar carbonaceous solid is introduced into a fluidized bed containing char particles maintained at a temperature in excess of the coal resolidification point by entraining coal particles in a gas stream preheated to a temperature in excess of about 300° F., i.e. about 150° C., but below the initial softening point of the coal. For the gasification of bituminous coals, preheat temperatures up to about 550° F., i.e. about 285° C., are said to be preferred. A fluid-cooled nozzle 16 is employed for feeding the stream of carrier gas and entrained coal particles into the gasifier zone. The injection velocity is regulated between superficial gas velocities as low as 15 feet/second and as high as 1,000 feet/second in response to variations in the fines content of the overhead gas. Such a system necessarily requires continual processing adjustments that are not desirable in continuous, commercial scale operations. In addition, the intermittent high injection velocities of the fresh coal introduced into the fluid-bed under the indicated conditions would generally be considered as having a potential for injection nozzle erosion that, if severe, could lead to a need for premature shutdown for nozzle replacement, adversely affecting the overall effectiveness of the coal conversion operation being carried out in the fluid-bed reaction zone.

A need thus exists in the art for improved methods for treating agglomerating coal or other solid carbonaceous particles in fluid-bed reaction zones. This need resides with respect to the effective injection of fresh particles of such coal or other carbonaceous materials under conveniently controlable conditions capable of avoiding excessive agglomeration of feed particles and thus preventing defluidization of the bed. Such improved methods would desirably avoid the necessity for pretreatment oxidation of the feed particles and/or their admixture with recycle char particles prior to being introduced into the fluid-bed reaction zone. The improvements required for technically and economically feasible coal injection operations must not, on the other hand, introduce peripheral processing disadvantages, such as undue injection nozzle wear or excessive gas consumption, that would adversely affect the technical-economic feasibility of coal conversion operations.

There also exists in the art a need for a comprehensive, integrated process reconciling the effect of various processing alternatives to assure the successful operation of established fluid-bed coal conversion technologies with fresh coal or other solid carbonaceous feed materials having agglomerating tendencies under the reaction conditions employed. Thus, the present uncertainties and the potential for defluidization and bed failure when employing variations in fresh feed material and/or otherwise desirable processing variations in particular applications or embodiments of known coal conversion technologies, including those variations necessary to scale-up from small scale pilot studies to larger scale studies, demonstration or commercial use, create a major deterrent to the utilization of such known and established technologies in the processing of agglomerating coals. The potential for the production of clean liquid and gaseous fuels from available coal supplies, e.g. by the hydrocarbonization process, or for the production of synthesis gas by known gasification techniques, has been disadvantaged by uncertainties concerning the overcoming of the agglomerating tendencies of the fresh feed material without resort to the economically undesired approaches of oxidative pretreatment, char recycle or complex process monitoring and regulation as referred to above. Improved, practical methods for overcoming defluidization due to excessive agglomeration of caking carbonaceous feed materials are genuinely needed, therefore, to enable such carbonaceous materials to be effectively employed as a part of the significant efforts to encourage the increased use of available coal supplies as one aspect of the comprehensive development of available energy sources to satisfy the energy requirements of modern, industrial societies.

In the feeding of agglomerating coal to a fluid-bed reaction zone, injection nozzles are commonly employed to inject the feed material into the reaction zone at the desired injection velocity to obtain adequate dispersion of the feed material with the non-agglomerating particles comprising the fluid-bed. Any suitable, conventionally available injection nozzle can generally be employed for the desired injection purposes. One such nozzle design is that disclosed in the Pfeiffer et al patent, U.S. Pat. No. 2,881,130, with regard to the fluid coking of heavy hydrocarbons. As shown therein, the feed material is fed into the nozzle in admixture with dispersion steam through a control conduit having a port or tip 8. Annular passage or shroud 9 surrounds the conduit, with purging steam or shroud gas being passed through passage 9 to keep the tip of the nozzle free of coke and to permit removal of the nozzle. In the fluid coking field and otherwise, shroud gas velocities of up to as high as 500 ft/sec have been employed. During the injection of agglomerating solid carbonaceous feed materials through such nozzles, it is likewise necessary to keep the nozzle tip free of undue particle accumulation that would lead to plugging of the nozzle. It is also highly desirable to employ overall injection conditions such as to avoid or minimize undesired nozzle erosion while, at the same time, assuring adequate dispersion of the agglomerating feed particles within the bed of non-agglomerating particles in the fluid-bed reaction zone. In fluid-bed operations employing a feed of fresh agglomerating coal and recycle char, at conventional injection velocities, e.g. about 50 ft/sec, at temperatures below the plastic transformation temperature of the fresh feed material, nozzle erosion is generally not a matter of concern. At relatively high injection velocities, e.g. over 200 ft/sec, such injection mixtures can, however, cause serious nozzle erosion problems, which must be obviated in order to achieve successful commercial operations on a continuous basis.

It will be appreciated that the carrier gas for the fresh carbonaceous feed and the injection nozzle shroud gas both contribute, to some extent, to the overall mechanical energy input available for the dispersion of fresh feed particles in the fluid-bed. It is highly desirable that such factors, as well as the effect of the fluidizing gas and of attrition jets, if employed, be understood in a comprehensive manner and utilized to enhance the injection of agglomerating feed materials into the fluid-bed and the overall coal conversion operation and to avoid the defluidization due to excessive agglomeration that impairs the commercial utilization of available coal supplies in known and established fluid-fed technologies capable of producing desired liquid and gaseous products.

It is an object of the invention, therefore, to provide a method of preventing excessive agglomeration of carbonaceous feed material in fluid-bed conversion operations.

It is another object of the invention to provide a method of avoiding defluidization in fluid-bed reaction zones employed in coal or other solid carbonaceous conversion operations.

It is another object of the invention to provide a method for employing caking coals on a continuous basis in a continuous fluid-bed reaction zone without defluidization and/or undue equipment plugging problems.

It is a further object of the invention to provide a method for avoiding excessive feed particle agglomeration while, at the same time, avoiding undue injection nozzle erosion.

It is a further object of the invention to provide improvements in the hydrocarbonization process for the preparation of fuel products from coal.

It is a further object of the invention to provide a process for enhancing the feasibility of utilizing agglomerating coals in fluid-bed coal conversion operations.

With these and other objects in mind, the invention is hereinafter described in detail, the novel features thereof being particularly pointed out in the appended claims.

SUMMARY OF THE INVENTION the shroud gas passed into a fluid-bed reaction zone through the shroud passage of an injection nozzle, employed to inject fresh solid carbonaceous particles into said zone, is injected at a velocity in excess of about 750 ft/sec and up to about 5,000 ft/sec in sufficient quantities to supply a substantial portion of the overall mechanical energy input to the reaction zone for dispersion of the fresh feed particles and for the breaking up of any agglomerates of such particles. The use of such high energy shroud permits the utilization of relatively low, conventional, fresh particle injection rates, e.g. from about 35 to about 175 ft/sec, without excessive agglomeration and resulting defluidization.

BRIEF DESCRIPTION OF THE DRAWINGS

The invention is hereinafter described with reference to the accompanying drawings in which.

DETAILED DESCRIPTION OF THE INVENTION

Figure 1:
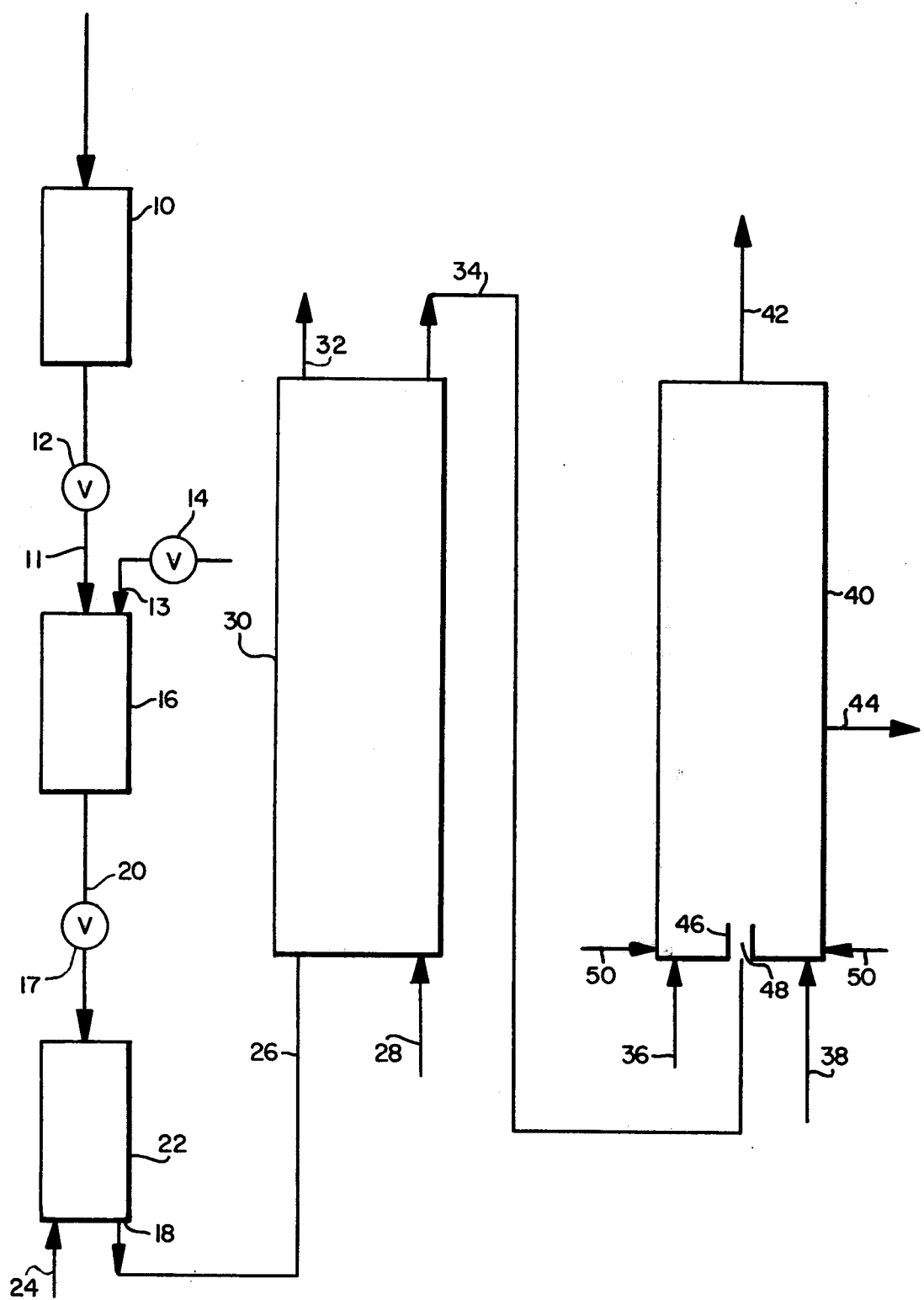
FIG. 1 is a schematic diagram illustrating particular embodiments of the fluid-bed coal conversion system in which the process of the invention is employed to prevent defluidization due to excessive agglomeration of the solid carbonaceous feed material.

The objects of the invention are accomplished, in the practice of the invention, by employing a high energy shroud to supply a substantial portion of the overall energy input to the reaction zone for dispersion of the fresh particles within the fluid-bed of non-agglomerating particles and for breaking up of any agglomerates of said fresh particles that may tend to form upon injection of the fresh solid carbonaceous particles into said reaction zone. In conventional practice, a shroud gas is passed through the annular or shroud passage of a feed injection nozzle for tip cleaning and temperature control. Shroud gas velocities of about 35–100 and up to 500 ft./sec. have been used. The present invention utilizes the shroud gas for the additional purpose of substantially preventing defluidization due to excessive agglomeration, with the shroud gas being passed through the injection nozzle means at a velocity in excess of about 750 ft./sec. The shroud gas, for purposes of the invention, is not only supplied at such higher injection velocities but in sufficient quantity to supply a substantial portion of said overall mechanical energy input to the reaction zone. The high energy shroud injection of the invention can be employed in any known fluid-bed coal conversion processing technology in which defluidization and bed failure due to excessive agglomeration may seriously interfere with, or even prevent, effective utilization of such technology on a continuous, commercially feasible basis. One such known fluid-bed coal conversion process is the hydrocarbonization process in which the gaseous reagent for fluidizing the bed and for reaction with fresh solid carbonaceous particles at reaction temperatures of from about 450° C. to about 750° C., preferably at from about 500° C. to about 600° C., is a hydrogen-rich oxygen-free gas. Another such process is the carbonization process in which said reagent comprises carbonization product gases and vapors and essentially inert carrier gas at reaction temperatures of from about 450° C. to about 700° C. A third such process is the gasification process in which solid carbonaceous particles are reacted with steam to form synthesis gas at temperatures generally from about 815° C. to about 1,100° C. It will be appreciated by those skilled in the art that various other known fluid-bed coal conversion processes may also be available or subsequently developed in which the present invention can be effectively utilized to avoid excessive agglomeration upon feeding of the fresh feed material to the fluid-bed reaction zone.

The fluid-bed reaction zone is conventionally maintained by passing a fluidizing medium through finely-divided solid particles. "Introduction velocity" as used throughout the specification means the superficial velocity of carrying gas. By a high velocity is meant a velocity sufficient to rapidly and uniformly disperse fresh coal particles entering the fluid-bed at a temperature below the plastic transformation temperature within a matrix of non-agglomerating particles in the fluid-bed. The non-agglomerating particles contained in the fluid-bed may include inert materials such as ash, sand, recycled char and the like which are inherently non-agglomerating. The non-agglomerating particles are, however, preferably hot, partially reacted coal particles and char particles that have undergone plastic transformation and are situated within the fluid-bed reaction zone at the reaction temperature, e.g. generally above about 450° C. Due to the difference of temperature between the entering coal particles and the reaction zone, heat is ordinarily transferred rapidly from the reaction zone to the entering coal particles, accelerating the plastic transformation process increasing the agglomerating tendency of the feed coal for a brief period of time. It has been found that when the preheated coal is rapidly introduced in the fluid-bed at a high velocity, however, the entering coal particles rapidly and uniformly disperse within the fluid-bed.

Such high speed injection or introduction velocity is not required in the practice of the invention. The hot, non-plastic char particles or materials present in the fluid bed at the applicable bed temperature transfer heat to the entering feed coal particles. The feed particles, preheated to below their softening point, i.e. below their plastic transformation temperature range, tend to form partial bonds with these dry, hot particles that have previously passed through the plastic transformation temperature range as well as bonding to one another. The extent of average bed particle growth is determined by a dynamic equilibrium in which particle growth is balanced by particle withdrawal and deagglomeration. Coal-to coal bonds are relatively strong whereas coal-to-char bonds are relatively weak, depending on the extent of solidification which occurs prior to contact of the particles. Two freshly molten coal particles tend to fuse into an indivisible agglomerate, whereas fresh coal would be linked to a char particle by a weaker bond.

With the high energy shroud of the invention, rapid dispersion of the entering coal particles occurs. The fresh particles thus traverse the plastic transformation temperature range with a minimum number of sticky particles contacting one another and at an overall mechanical or kinetic energy input level sufficient to break up the weaker bonds of the coarser agglomerated particles. Consequently, agglomerating or caking coals can be injected into the fluid-bed reaction zone and devolatilized without defluidization occurring as a result of excessive particle agglomeration.

This invention is particularly applicable as an improvement in a hydrocarbonization process utilizing a dense phase fluid-bed. By the term "hydrocarbonization" as employed throughout the specification is meant a pyrolysis or carbonization in a hydrogen-rich atmosphere under such conditions that significant reaction of hydrogen with coal and/or partially reacted coal and/or volatile reaction products of coal occurs. By dense phase as used throughout the specification is meant a concentration of solids in fluidizing gas of from about 5 pounds to about 45 pounds of solids per cubic foot of gas. In a hydrocarbonization process employing a dense phase fluid-bed, the particles in the bed are substantially backmixed, which ensures a near uniform-composition of particles throughout the bed.

The overall mechanical or kinetic energy level necessary and sufficient to prevent excessive particle agglomeration will vary for each particular coal or carbonaceous feed material. The minimum energy required for any particular coal can readily be determined by incrementally decreasing the high energy shroud input level to the point of bed failure. For such purposes, the bed velocity will conveniently be maintained at a constant rate, with the fresh feed injection velocity being maintained at a convenient rate, such as 35–100 ft./sec. The particular high energy shroud conditions employed in the practice of the invention for any such coal may be varied, as will be appreciated by those skilled in the art, depending upon the overall energy input of the injection gas, the shroud gas, the bed fluidizing-reagent gas and any attrition jets employed. It will be further appreciated that the energy-to-coal ratio and and the gas-to-coal ratio of the overall plant design can be adjusted by a variation of such energy and gas input factors to achieve efficient overall technical and economic performance.

It will be appreciated that the invention can be practiced by injecting coal or other solid, carbonaceous fresh feed particles into the lower portion of the reaction zone in an essentially vertically upwards direction, as in the substantially axially central portion thereof. The feed particles may be introduced into the reaction zone in any other convenient direction, i.e., upward, downward, sideways or otherwise. For example, the feed particles may be introduced into the reaction zone from the side thereof in a substantially horizontal, sideward direction. The feed may, furthermore, be introduced into the reaction zone through two or more injection points or nozzles positioned vertically along the side of the reaction zone, including embodiments in which the particles are introduced into the reaction zone through injection points located in essentially opposed positions on the wall of the reaction zone. In certain embodiments, a multiplicity of injection points may be employed.

Figure 3:
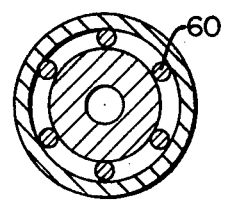
FIG. 3 is an end view of the injection nozzle-shroud configuration of FIG. 2.

The reaction temperature within the fluid bed reaction zone is generally maintained above about 450° C. for known coal conversion processes, with such temperatures being generally from about 500° C. to about 750° C., e.g. about 500°–600° C., for hydrocarbonization. The high energy shroud of the invention supplies a substantial portion of the overall mechanical energy input to the reaction zone for dispersion of the fresh feed particles and for breaking up any agglomerates formed by the injection of said fresh feed particles into the reaction zone. The shroud gas, which may be an inert gas, such as nitrogen, or a gaseous reagent for the fresh carbonaceous feed particles, e.g. hydrogen, is advantageously supplied in sufficient quantities and at such velocities so as to advantageously supply at least half of said energy input to the reaction zone, preferably at least about 80% of said energy input to the reaction zone. For this purpose, shroud gas is passed through the injection nozzle shroud passage at a velocity in excess of about 750 ft./sec. up to about 5,000 ft./sec., preferably in the range of from about 1,000 to about 3,000 ft./sec. As indicated above, any convenient, commercially available injection nozzle, such as that illustrated in FIG. 3 of U.S. Pat. No. 2,881,130 may be employed in the practice of the invention. It is within the scope of the invention to employ, as an alternate to annular passage 9 therein disclosed and illustrated, a number of shroud passages positioned around the periphery of the fresh feed injection conduit. It is particularly advantageous to pass the shroud gas into the reaction zone tangentially to the fresh feed injection conduit to enhance the dispersion of the shroud gas and its dispersion of the fresh feed particles within the bed of non-agglomerating solid carbonaceous particles. The fresh feed particles passed through the injection nozzle in a suitable carrier gas will be introduced at an injection velocity in excess of about 20 ft./sec., e.g. from about 35 to about 175 ft./sec., in a dense dispersed jet, e.g. greater than one volume percent solids, being commonly employed in conventional practice. At such injection velocities, erosion of the injection nozzle is not generally a significant operation problem. The feed particles can be preheated by known techniques, such as in a fluid-bed heating zone or in suitable means for accomplishing dense phase heating prior to being introduced into the reaction zone. In such embodiments, the fresh feed particles will commonly be preheated to a temperature less than about 300° C. to assure that such heating is to a temperature below the plastic transformation temperature range of the particles.

It had been discovered that introducing a fluidized stream of coal particles into a dense phase, fluid-bed reaction zone at a velocity of more than about 200 feet per second in a manner described hereinabove substantially prevents excessive agglomeration or caking of the fluid-bed by the imparting of sufficient mechancial energy to the reaction zone to break up the coarser agglomerates and to rapidly and uniformly disperse the fresh particles within the bed. When a lower injection velocity, for example, about 100 feet per second is used, without other modifications from conventional practice, agglomeration of the fluid-bed is not prevented. In order to prevent defluidization due to excessive agglomeration in the fluid-bed reaction zone at lower feed injection velocities, it has now been discovered that shroud gas can be passed through the shroud passage or passages on the feed injection nozzle means at a velocity in excess of about 750 ft./sec/ with the shroud gas being employed in sufficient quantity to supply a substantial portion, as indicated above, of the overall energy input into the reaction zone for dispersion of the fresh particles within the bed of non-agglomerating particles and for the breaking up of any agglomerates that may tend to form upon injection of the fresh carbonaceous particles into the reaction zone. The energy-to-coal ratio of the high energy shroud of the invention will ordinarily be higher than that required for the high injection velocity alternative because less gas is available to inject into the reaction zone in the practice of the invention.

The energy-to-coal ratio in the practice of the invention will generally be at least about $40 \times 10^{-4}$, preferably at least about $100 \times 10^{-4}$, horsepower-hours per pound of coal introduced. The energy-to-coal ratio, as referred to herein, refers to the ratio of the kinetic horsepower (in the shroud gas jet as calculated by the adiabatic expansion of the shroud gas jet) to the coal feed rate. "Reaction zone" as used throughout the specification is meant to include that area wherein carbonaceous, combustible, solid and sometimes liquid particles, are reacted to form char, liquid and/or vapor fuel products in coal conversion processes such as carbonization, gasification and dry hydrogenation (hydrocarbonization). A zone of reaction e.g., hydrocarbonization zone is the reaction zone in a hydrocarbonization process.

This invention is applicable to the various coal conversion processes mentioned hereinabove. For example, a hydrocarbonization process can be improved to handle both agglomerating and/or non-agglomerating coals in a continuous manner and maintain fluidization of the fluid-bed. In a hydrocarbonization process, a dense phase flow of coal particles may be passed through a preheating zone before entering a fluid-bed hydrocarbonization zone wherein the coal particles are rapidly heated in the presence of a hydrogen-rich, essentially oxygen-free gas, to an elevated temperature above about 450° C. where the desired reactions can occur.

Coals have been classified according to rank as noted in the following table, Table A:

TABLE A

Classification of Coals by Rank[a]
(Legend: F.C. = fixed carbon; V. M. = volatile matter; B.t.u. = British thermal units)

| Class | Group | Limits of fixed carbon or B.t.u., asb free basis |
|---|---|---|
| I. Anthracite | 1. Meta-anthracite | Dry F.C., 98% or more (dry C.M., 2% or less) |
| | 2. Anthracite | Dry F.C., 92% or more and less than 98% (dry V.M., 8% or less and more than 2%) |
| | 3. Semianthracite[b] | Dry F.C., 86% or more and less than 92% (dry V.M., 14% or less and more than 8%) |
| II. Bituminous[d] | 1. Low-volatile bituminous coal | Dry F.C., 78% or more and less than 86% (dry V.M., 22% or less and more than 14%) |
| | 2. Medium-volative bituminous coal | Dry F.C., 69% or more and less than 78% (dry V.M., 31% or less and more than 22%) |
| | 3. High-volatile A bituminous coal | Dry F.C., less than 69% (dry V.M., more than 31%) |
| | 4. High-volatile B bituminous coal | Moist[c] B.t.u., 13,000 or more and less than 14,000[c] |
| | 5. High-volatile C bituminous coal | Moist B.t.u., 11,000 or more and less than 13,000[e] |
| III. Sub-bituminous | 1. Sub-bituminous A coal | Moist B.t.u., 11,000 or more and less than 13,000[e] |
| | 2. Sub-bituminous B coal | Moist B.t.u., 9,500 or more and less than 11,000[e] |
| | 3. Sub-bituminous C coal | Moist B.t.u., 8,300 or more and less than 9,500[e] |
| IV. IV. Lignitic | 1. Lignite | Moist B.t.u., less than 8,300 |
| | 2. Brown coal | Moist B.t.u., less than |

TABLE A-continued

Classification of Coals by Rank[a]
(Legend: F.C. = fixed carbon; V. M. = volatile matter; B.t.u. = British thermal units)

| Class | Group | Limits of fixed carbon or B.t.u., asb free basis |
|---|---|---|
| | | 8,300 |

[a]This classification does not include a few coals that have unusual physical and chemical properties and that come within the limits of fixed carbon or B.t.u. of the high-volatile bituminous and sub-bituminous ranks. All of these coals either contain less than 48% moisture and ash free fixed carbon or have more than 15,500 moist, ash free B.t.u.
[b]If agglomerating, classify in low volatile group of the bituminous class.
[c]Moist B.t.u. refers to coal containing its natural bed moisture but not including visible water on the surface of the coal.
[d]It is recognized that there may be noncaking varieties in each group of the bituminous class.
[e]Coals having 69% or more fixed carbon on the dry, mineral-matter-free basis shall be classified according to fixed carbon, regardless of B.t.u.
[f]There are three varieties of coal in the high-volatile C bituminous coal group, namely, Variety 1, agglomerating and non-weathering; Variety 2, agglomerating and weathering,; Variety 3, nonagglomerating and non-weathering.
Source: A.S.T.M. D388-38 (ref. 1).

Agglomerating coals, such as most bituminous and some sub-bituminous coals, are strongly agglomerating in a hydrogen atmosphere. They can not be handled conventionally without a pretreatment step. These coals may now be handled without an injurious degree of defluidization by the process of this invention alone or in combination with a pretreatment step, if necessary. If a pretreatment step is necessary, the needs for pretreatment are milder and cost less. For example, at present even after heavy pretreatment, the use of a highly agglomerating coal such as Pittsburgh Seam Coal in a hydrocarbonization process presents the problem of agglomeration occurring in the fluid-bed. However, it is beneficial to use the process of this invention to overcome this agglomerating problem. Those skilled in the art will recognize that any number of suitable pretreatment steps may be applied in combination with the process of this invention for the handling of coals which are either highly agglomerating or highly agglomerating in a hydrogen-containing atmosphere. These pretreatment steps include, for example, but are not limited to, chemical pretreatment such as oxidation or mixing with inert solids such as recycle char.

The manner in which the invention is carried out will be more fully understood from the following description when read with reference to the accompanying drawing which represents a semi-diagrammatic view of an embodiment of a system in which the process of this invention may be carried out.

FIG. 1 illustrates coal supply vessels 10 and 16, a coal feeder 22, a preheater 30 and a reactor vessel 40. Lines are provided for conveying finely divided coal through the vessels in sequence. A line 26 conveys the coal from the pick up chamber 18 to the preheater 30. A line 34 conveys the coal from preheater 30 into the reactor vessel 40. A line 44 conveys devolatized coal (termed "char") from the reaction vessel 40 for recovery as solid product or for recycle. A line 42 is provided for conveying liquid and vapor products from the reaction vessel 40 for further processing and/or recycle.

According to the process of this invention, the feed coal is in particulate form, having been crushed, ground, pulverized or the like to a size finer than about 60 U.S. mesh, and preferably finer than about 100 U.S. mesh. Furthermore, while the feed coal may contain absorbed water, it is preferably free of surface moisture. Coal particles meeting these conditions are herein referred to as "fluidizable." Any such absorbed water will be vaporized during preheat. Moreover, any such absorbed water must be included as part of the inert carrying gas and must not be in such large quantities as to give more carrying as than required.

The coal supply vessels 10 and 16 each can hold a bed of fluidizable coal particles, which are employed in the process. Coal supply vessel 10 is typically a lock-hooper at essentially atmospheric pressure. Coal supply vessel 16 is typically a lock-hooper in which fluidized coal can be pressurized with process gas or other desired fluidization gases.

Operation of vessels 10, 16, and 22 can be illustrated by describing a typical cycle. With valves 14 and 17 closed, lock-hooper 16 is filled to a predetermined depth with coal from lock-hopper 10 through open valve 12 and line 11 at essentially atmospheric pressure. Then, with valves 12 and 17 closed, lock-hopper 16 is pressurized to a predetermined pressure above reaction system pressure through open valve 14 and line 13. Valves 12 and 14 are then closed and coal is introduced into fluidized feeder vessel 22 through open valve 14 and line 13. Valves 12 and 14 are then closed and coal is introduced into fluidized feeder vessel 22 through open valve 17 and line 20. The cycle about lock-hopper 16 is then repeated. A typical time for such a cycle is from about 30 minutes. With valve 17 closed, fluidized coal is fed at a predetermined rate through line 26 to the downstream-process units. Other variations of the feeding cycle to the fluidized feeder are possible, of course, but they are not illustrated herein since they do not form the inventive steps of this process.

In fluidized feeder 22, a fluidizing gas passes through line 24 at a low velocity sufficient to entrain the fluidizable coal and convey it in dense phase flow through line 26 and into the bottom of coal preheater 30, or directly to line 34 if no preheat is required. Alternately, additional gas could be added to the line conveying the coal in a dense phase flow through line 26 to assist in the conveyance. Any non-oxidizing gas can be used as the fludizing gas e.g. fuel gas, nitrogen, hydrogen, steam and the like. However, it is preferable, in general, to use reaction process gas or recycle product gas.

Coal preheater 30 is a means to rapidly preheat, when desirable, the finely divided coal particles, under fluidized conditions, to a temperature below the minimum temperature for softening or significant reaction range, in the substantial absence of oxygen. The maximum allowable temperature of heating is generally in the range of from about 325° C. to about 400° C. depending on the feed material employed. The stream of gas-fluidized coal in dense phase is heated upon passing rapidly through the heater having a very favorable ratio of heating surface to internal volume. The coal is heated in the heater 30 to the desired temperature by any convenient means of indirect heat exchange.

Preheated fluidized coal particles exit the preheater 30 through line 34 and enter at or near the bottom of the reactor vessel 40 substantially near the center of the bottom. According to this invention, the coal particles are introduced into the fluid-bed reaction zone through the reactor bottom at a relatively low injection velocity as indicated above. The fluidized stream of coal particles may be accelerated to the desired velocity by addition of accelerating gas and/or along a constricted path of confined cross-section. A nozzle, narrow inlet port, tapered channel or any inlet means which narrows, constricts or necks down the cross-sectional area of the passageway to the inlet where the fluidized coal particles enter the reactor may be used to accelerate the fluidized stream of particles to the desired velocity. The stream of preheated, fluidizable coal particles is introduced into the central upflow zone of the fluid-bed within the reaction vessel at the velocity desired in an essentially vertically upwards direction, preferably through the bottom of the reaction vessel.

Recycle oil may also be fed into reactor 40 through line 36. Injection of the recycle is also preferably at a stream velocity of about 200 feet per second or greater, and more preferably about 400 feet per second or greater into the central upflow zone of the fluid-bed of the reactor through the bottom of the reactor vessel in an essentially vertically upwards direction. Like the entering coal particles, the recycle oil stream follows a substantially ascending path about a substantially axially central portion of the reaction vessel. In the injection of the recycle oil and fluidizable coal particles, it is essential that they be introduced into the reactor vessel in such a way that they do not immediately and directly strike the walls of the reactor vessel, a result which could lead to unnecessary and undesirable agglomeration.

Only one inlet each for entry of the preheated coal particles and the recycle oil is shown in FIG. 1. These inlets may also represent a multiplicity of inlets for ease of operation of this process. A multiplicity of inlets may be desirable, for example, where the reactor is large, or when separate recycle streams of oil are being injected into the reactor. The entry points for the coal particles and/or recycle oil are preferably situated near the point where the vertical axis intersects the reactor bottom. Each stream of coal particles and/or recycle oil is preferably introduced at a high velocity at each inlet in an essentially vertically upwards direction, the inlets situated in or near the reactor bottom substantially near the point where the vertical axis intersects the reactor bottom. In this manner, the separate streams of entering carbonaceous materials are kept separate and apart until rapdily mixed in the fluid-bed with partially reacted coal and char particles.

The entering carbonaceous materials are reacted with a suitable reagent in the reaction zone at a temperature above about 450° or 500° C.

Char from reactor vessel 40 is continuously removed through line 44.

Liquid and vapor products are removed from the reactor vessel 40 through line 42. Fluidization gas is fed into the reactor vessel 40 through line 38, the type gas depending on the type process involved. For example, steam or steam and oxygen are fed into a gasifier in a gasification process; a non-reacting gas is fed into a carbonizer in a carbonization process; and a hydrogen-containing substantially oxygen-free gas is fed into a hydrocarbonizer in a hydrocarbonization process.

As described herein, advantages may be obtained in embodiments of the invention by passing the preheated particles to the fluid-bed reaction zone at relatively low injection velocities while employing a high energy shroud on the injection nozzle to prevent excessive agglomeration and defluidization. Preheated particles in line 34 of the drawing, for example, are passed rapidly and directly into the reaction zone from the bottom thereof through injection nozzle 46 which is shown extending slightly upward into the reaction zone. Nozzle 46 is shown with an annular shroud passage 48 through which a shroud gas may be passed at a high velocity and in such quantities as to furnish a substantial portion of the overall energy input to prevent excessive agglomeration of the feed particles. It will be appreciated in the art that, in other embodiments of the invention, the fresh feed particles can be introduced into reactor 40 in any other direction, as by injection from the side thereof in a substantially horizontal, sideward direction through one or a series of injection points positioned along the side of reactor 40. In particular embodiments, the injection points may be located in essentially opposed positions on the wall of reactor 40 for further turbulent mixing. In other embodiments, the feed material may be passed through line 34 for downward injection into reactor 40. It will also be understood that reactor 40 may be instructed with a lower reaction zone, an enlarged upper zone and a cone-like transition zone, the upper zone having a lower bed velocity faciliatating separation of gaseous materials from the bed and minimizing undesired carry-over of fines in the gaseous efficient streams. It will be further understood that the feed inlet nozzle means 46 may be positioned so that the injection point is substantially at the wall of the reaction vessel, e.g. at the bottom thereof, but may extend somewhat into said zone. In the upward injection embodiments, for example, the injection nozzle may extend, for example, 2 feet or more upward into the reaction zone. The injection point need not extend appreciably into the interior of the fluid-bed region, however, as is required in the Phinney patent, U.S. Pat. No. 2,709,675 which relates to low speed coal injection, preferably in conjunction with a draft-tube positioned within the fluid-bed reaction zone. The high energy shroud gas passing through shroud passage 48 supplies a substantial portion of the overall mechanical energy employed to break up agglomerates of the feed particles. Attrition jets are also employed, as required, to break up agglomerates, supplementing the energy supplied by the injection gas, by the fluidizing gas and by the high energy shroud. In the embodiment illustrated in the drawing, for example, attrition jets represented generally by the number 50, may be conveniently positioned beneath the feed injection point so as to break up larger agglomerates that may tend to settle in the boot portion at the bottom of the reaction zone.

Among the various injection nozzle shroud configurations employed in the practice of illustrative examples of the invention have been (1) a concentric annulus formed by a 0.25" outside diameter feed tube and concentric tube walls; (2) a tapered concentric annulus; (3) a crimped circular annulus with four filed flats; and (4) a shroud containing six 0.0135" ports positioned at 30° to the coal injection axis. In the concentric annulus configuration, a ⅜" diameter outside tube has been employed, with the injection nozzle feed tube tapering to a 0.082" injection opening with the uniform diameter shroud passage having an opening of 0.027", with three guide members employed to position the feed tube within the tube walls. The tapered concentric annulus configuration, illustrated in FIGS. 2 and 3 of the drawings, was prepared with a 0.082" inside diameter port or injection opening 52 in 0.25" outside diameter feed tube 54. Tapered shroud portion 56 with an annulus outside diameter of 0.208" and a 0.003" planned clearance extends from an initial tube wall portion 58 having a ⅜" outside diameter and projects about 0.10" beyond the tip of injection port 52, which is centered in the shroud by jamming against six 0.018" outside diameter nickel wires 60 hexagonally spaced in the annulus.

Figure 2:
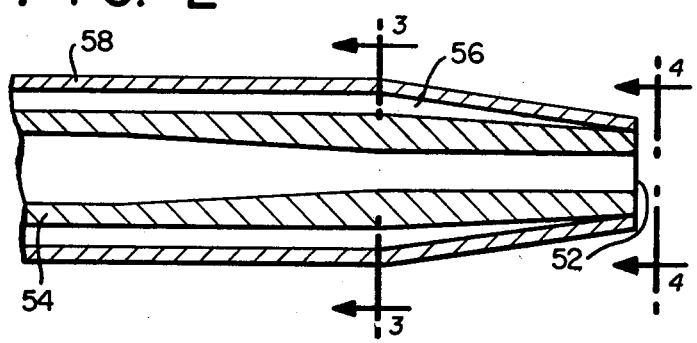
FIG. 2 is a side elevation view of a tapered concentric shroud configuration of an injection nozzle suitable for use in the practice of the invention.
Figure 4:
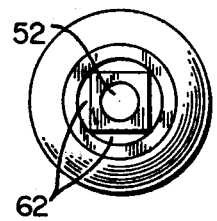
FIG. 4 is the end view of an alternate injection nozzle-shroud configuration employing a crimped circular annulus with four filed flats.

The crimped circular annulus illustrated in FIG. 4 was prepared by filing four shallow flats 62, 0.11" in width on an 0.25" outside diameter feed tip 52 as shown in FIG. 2, that was then press fitted into a tapered shroud portion 56.

Figure 5:
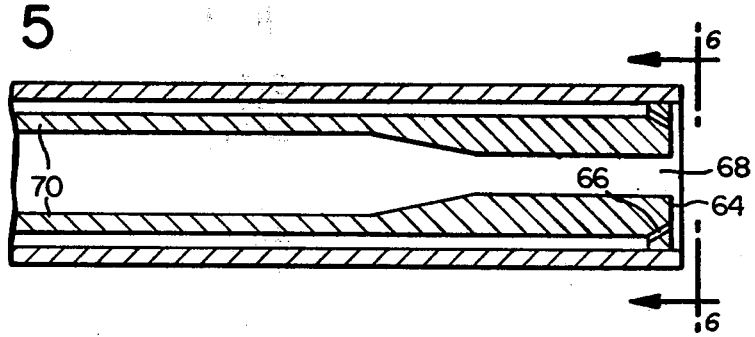
FIG. 5 is a side view of an injection nozzle having a shroud containing six shroud gas injection ports.
Figure 6:
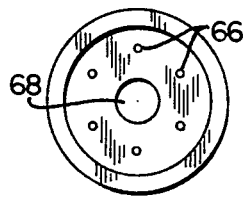
FIG. 6 is an end view of the injection nozzle-shroud configuration of FIG. 5.

FIGS. 5 and 6 illustrate a shroud configuration in which a nozzle tip 64 was built with six 0.0135" inside diameter holes 66 surrounding the 0.082" feed port 68 at said nozzle tip. The six shroud holes were oriented 30° to the axis of the coal feed nozzle. A ¼" outside diameter feed tube 70 and a concentric ⅜" outside diameter tube wall 72 were employed in the preparation of the nozzle. It will be understood, however, that the disclosed shroud configurations are illustrative only, and various other configurations capable of supplying shroud gas at the velocity and energy levels desired can be employed in the practice of the invention.

EXAMPLE I

The advantages of the novel high energy shroud process were determined in a hydrocarbonization coal conversion operation in which Illinois No1. 6 coal, without recycle char and without pretreatment oxidation, was introduced upwardly into a fluid-bed hydrocarbonization reaction zone at an initial injection velocity of 180 ft./sec. The feed coal had been preheated to a carrier gas/coal mixture temperature of between 320° C. and 365° C. The coal particles, which were 60–70%-200 mesh, were fed to the reaction zone through an injection nozzle exit point located 20" above the grid at the bottom of the reaction zone. The coal feed rate ranged from 24 to 30 lb./hr. The injection gas/coal rate was decreased over a period of time from 12 to 4.2 scf (standard cubic feet) of gas per pound of coal, the injection velocity being decreased slowly from said 180 to 70 ft./sec. Attrition jets positioned in the boot of the reactor, i.e. below the injection nozzle exit point, were employed at a velocity of 620–680 ft./sec., with the kinetic energy of the attrition jets being decreased from 84 to $67 \times 10^{-4}$ horsepower-hrs. per lb. of coal. The injection nozzle had a tapered, circular, concentric shroud passage. The velocity of the shroud gas was of a significantly higher order of magnitude than employed for conventional purposes, and said high velocity, high energy shroud supplied a substantial portion of the overall energy input into the reaction zone for dispersion of fresh particles within the fluid bed of char particles and for breaking up of agglomerates so as to avoid defluidization due to excessive particle agglomeration. Thus, a shroud gas velocity of 3200 ft./sec. was employed, with the kinetic energy/coal ratio being $220 \times 10^{-4}$ hp-hr/lb. of coal, the energy supplied by the shroud gas comprising about 60–80% of the kinetic energy input to the reaction zone over the course of the hydrocarbonization process operation carried out in the reactor. The bed velocity at the bottom of the reaction zone was 2.2 ft./sec., with the bed density at this portion of the zone being 16 lb./ft$^3$. Three inches from the top of said zone, the bed velocity was 2.6–2.8 ft./sec., with a bed density at this point of from 8.7 to 7.2 lbs./ft$^3$. The reactor employed had an enlarged upper zone and a cone-like transition zone, with the upper zone having a lower bed velocity to facilitate separation of gases from solids without excessive carry-over of fines. The bed velocity in the upper zone ranged from 0.66 to 0.72 ft./sec., with the bed density being 7.2 lbs./ft$^3$. No defluidization or bed failure was encountered. Rapid dispersion of the feed particles with the char in the reaction zone, together with deagglomeration due to the mechanical or kinetic energy supplied to said reaction zone by the high energy shroud gas and the other energy input sources, served to maintain the average bed size in a range suitable for fluidization.

EXAMPLE II

In operations utilizing the reactor system of Example I above, the indicated Illinois No. 6 coal was injected into the hydrocarbonization reactor at an initial injection velocity of 170 ft./sec. at a gas plus coal injection temperature of 285° C. The coal feed rate was increased slowly from 23 to 36 lb./hr., with the injection gas/coal feed rate being reduced from an initial 32 to 18 scf of gas per pound of coal. The injection velocity was thus decreased incrementally from said 170 to 150 ft./sec. Attrition jets positioned in the boot portion of the reactor below the coal injection point were used at velocities from 465 to 685 ft./sec., corresponding to an energy-to-coal ratio of from 24 to $110 \times 10^{-4}$ hp-hr./lb of coal. The injection nozzle shroud gas hydrogen was passed through the shroud passages formed by four filed flats, the injection nozzle being positioned 18" above the grid, at velocities that increased from an initial 630 to 2200 ft./sec. The kinetic energy to coal ratio of the high-energy shroud was increased from 95 to $350 \times 10^{-4}$ hp-hr./lb. of coal. The bed velocity at the bottom of the reaction zone was 2.0–2.4 ft./sec. with a bed density at that point of from 8.6 to 12 lbs./ft$^3$. At a point 3" from the top of said zone, the bed velocity was 3–4 ft./sec., with a bed velocity of 8.8–11 lbs./ft$^3$. In the enlarged upper zone, the bed velocity was reduced to 0.79–1 ft./sec., with a bed density in said upper zone of 7.9–12 lbs./ft$^3$. Excessive agglomeration was avoided under such conditions in which the high energy shroud supplied a substantial portion of the overall energy input to the reaction zone for dispersion and deagglomeration of the particles fed to the reaction zone under relatively low injection velocity conditions.

It should be noted that excessive agglomeration and defluidization are not prevented simply by a high shroud gas velocity, but by such high velocity injection of shroud gas in such quantities as to provide sufficient mechanical or kinetic energy to assure that said excessive agglomeration and resulting defluidization are prevented. The invention has been employed, in other examples, with Pittsburg No. 8 as the feed coal to achieve the desirable and unique results herein disclosed and claimed.

The invention constitutes a significant development in the field of fluid-bed and conversion operations ulitizing caking coals or other carbonaceous materials of an agglomerating nature. Sufficient mechanical energy is imparted to the reaction zone by the high energy shroud to break up the coarser agglomerates that may form and to rapidly and uniformly disperse the fresh feed particles within the fluid bed of non-agglomerating particles within the reaction zone. The invention provides desirable operating flexibility and avoids the economic disadvantages and nozzle erosion concerns normally associated with the high injection velocity approach to avoiding excessive particle agglomeration. The process of the invention enhances the technical and economic feasibility of desirable coal conversion operations, provides advantageous flexibility in meeting the overall material balance limitations of commercial plant designs, and represents an important feature of efforts to develop practical technologies for the use of caking coals in meeting the ever-increasing energy requirements of modern industrial societies.

What is claimed is:

1. A method for substantially preventing defluidization in a fluid-bed reaction zone maintained at a reaction temperature above 450° C. and containing a bed of non-agglomerating particles at the reaction temperature, said method comprising:
   (a) introducing fresh solid carbonaceous particles in a carrier gas into said reaction zone through injection nozzle means at an injection velocity of from about 35 to about 175 ft/sec, said solid carbonaceous particles having been preheated to a temperature below their plastic transformation temperature and being injected directly into said reaction zone and into direct contact with the non-agglomerating particles therein;
   (b) introducing a gaseous reagent into said reaction zone for fluidizing said bed and for reaction with said fresh solid carbonaceous particles at said reaction temperature within said zone; and
   (c) passing a shroud gas through a shroud passage on said injection nozzle means at a velocity in excess of about 750 ft/sec, said shroud gas being employed in sufficient quantity to supply a substantial portion of the overall energy input into said reaction zone for dispersion of the fresh particles within said bed of non-agglomerating particles and for breaking up of any agglomerates of said fresh particles that may tend to form upon injection of said fresh solid carbonaceous particles into said reaction zone, whereby the high energy shroud effectively contributes to the prevention of defluidization of the bed by overcoming the agglomerating tendencies of the fresh solid carbonaceous particles.

2. The method of claim 1 in which said shroud gas is passed into said reaction zone through an annular shroud passage surrounding the fresh feed injection conduit of said injection nozzle means.

3. The method of claim 1 in which said shroud gas is passed into said reaction zone through shroud passages positioned around the periphery of said fresh feed injection conduit.

4. The method of claim 1 in which said reaction zone is a gasification zone, and said reagent comprises steam.

5. The method of claim 4 in which said reaction temperature is from about 815° C. to about 1000° C.

6. The method of claim 4 in which said shroud gas velocity is from about 750 ft/sec to about 5,000 ft/sec.

7. The method of claim 6 in which at least half of said energy input to the reaction zone is supplied by said shroud gas, said energy input comprising that supplied by the shroud gas, by the carrier gas for fresh carbonaceous particles, and by the fluidizing-reagent gas.

8. The method of claim 6 in which said shroud gas velocity is from about 1,000 to about 3,000 ft/sec.

9. The method of claim 6 in which said energy supplied by the shroud gas comprises at least about 80% of said energy input to the reaction zone.

10. The method of claim 7 in which said shroud gas comprises steam.

11. The method of claim 7 in which said shroud gas comprises nitrogen.

12. The method of claim 1 in which said shroud gas velocity is from about 750 ft/sec to about 5,000 ft/sec.

13. The method of claim 12 in which at least half of said energy input to the reaction zone is supplied by said shroud gas, said energy input comprising that supplied by said shroud gas, by the carrier gas for fresh carbonaceous feed particles, and by the fluidizing-reagent gas.

14. The method of claim 13 in which said shroud gas velocity is from about 1,000 to about 3,000 ft/sec.

15. The method of claim 13 in which said shroud gas comprises an inert gas not reacting with said fresh carbonaceous particles under the reaction conditions within the reaction conditions within said reaction zone.

16. The method of claim 13 in which said shroud gas comprises a gaseous reagent that reacts with said fresh solid carbonaceous particles under the reaction conditions within said reaction zone.

17. The method of claim 13 in which said energy supplied by the shroud gas comprises at least about 80% of said energy input to said reaction zone.

18. The method of claim 13 in which said shroud gas is passed into the reaction zone tangentially to said fresh feed injection conduit to enhance the dispersion of said shroud gas and its dispersion of fresh particles within the bed of non-agglomerating solid carbonaceous particles.

19. The method of claim 13 in which said injection velocity is from about 50 to about 100 ft/sec.

20. The method of claim 19 in which solid carbonaceous solids are introduced into said reaction zone through injection points located in essentially opposed positions on the walls of the reaction zone.

21. The method of claim 13 in which said preheat temperature below the plastic transformation temperature of the fresh particles is less than about 300° C.

22. The method of claim 21 in which said solid carbonaceous particles are preheated in a dense phase prior to being introduced into said reaction zone.

23. The method of claim 13 in which said solid carbonaceous particles are introduced into the reaction zone from the side thereof in a substantially horizontal, sideward direction.

24. The method of claim 23 in which said solid carbonaceous particles are introduced into the reaction zone through a plurality of injection points positioned along the side of said reaction zone, the shroud gas being injected at said shroud velocity at each of said injection points.

25. The method of claim 13 in which said solid carbonaceous particles are introduced into the lower portion of the reaction zone in an essentially vertically upwards manner.

26. The method of claim 25 in which said solid carbonaceous particles are introduced into the reaction zone in the substantially axially central portion thereof.

27. The method of claim 1 in which said reaction zone is a carbonization zone, and said reagent comprises carbonization product gases and vapors and essentially inert carrier gas.

28. The method of claim 27 in which said reaction temperature is between about 450° C. and about 700° C.

29. The method of claim 27 in which said shroud gas velocity is from about 750 ft/sec to about 5,000 ft/sec.

30. The method of claim 29 in which at least half of said energy input to the reaction zone is supplied by said shroud gas, said energy input comprising that supplied by the shroud gas by the carrier gas for fresh coal by the fluidizing-reagent gas jets positioned on or near the reaction zone and adapted to break up agglomerates of said fresh coal that may have formed during said carbonization reaction.

31. The method of claim 30 in which said shroud gas velocity is from about 1,000 to about 3,000 ft/sec.

32. The method of claim 30 in which said energy supplied by the shroud gas comprises at least about 80% of said energy input to the reaction zone.

33. The method of claim 30 in which said shroud gas comprises hydrogen.

34. The method of claim 30 in which said shroud gas comprises nitrogen.

35. The method of claim 30 in which said shroud gas comprises carbonization product gases and vapors.

36. The method of claim 1 in which said solid carbonaceous particles comprise fresh coal particles, said non-agglomerating particles comprise partially reacted coal and char particles, said reaction zone is a hydrocarbonization zone, said reagent is a hydrogen-rich, oxygen-free gas and said reaction temperature is from about 450° C. to about 750° C.

37. The method of claim 36 in which said reaction temperature is from about 500° C. to about 600° C.

38. The method of claim 36 in which said reaction temperature is from about 650° C. to about 750° C.

39. The method of claim 36 in which said shroud gas velocity is from about 750 ft/sec to about 5000 ft/sec.

40. The method of claim 39 in which at least half of said energy input to the reaction zone is supplied by said shroud gas, said energy input comprising that supplied by the shroud gas, by the carrier gas for fresh coal, and by the fluidizing-reagent gas.

41. The method of claim 40 in which said shroud gas velocity is from about 1,000 to about 3,000 ft/sec.

42. The method of claim 40 in which said energy supplied by the shroud gas comprises at least about 80% of said energy input to the reaction zone.

43. The method of claim 40 in which said shroud gas comprises nitrogen.

44. The method of claim 40 in which said shroud gas comprises hydrogen.

* * * * *